United States Patent [19]

Hill, Jr. et al.

[11] 3,914,150

[45] Oct. 21, 1975

[54] COPOLYAMIDE-SOLVENT SYSTEMS

[75] Inventors: Harold Wayne Hill, Jr.; Robert W. Campbell, both of Bartlesville, Okla.

[73] Assignee: Phillips Petroleum Company, Bartlesville, Okla.

[22] Filed: May 20, 1974

[21] Appl. No.: 471,819

Related U.S. Application Data

[62] Division of Ser. No. 269,096, July 5, 1972, Pat. No. 3,817,903.

[52] U.S. Cl. ............ 156/308; 156/331; 260/33.4 R; 260/33.8 R; 260/78 R
[51] Int. Cl.² ............................................. C09J 5/02
[58] Field of Search ............ 117/161 P; 260/33.4 R, 260/33.8 R, 78 R; 156/308, 327, 331, 333

[56] References Cited
UNITED STATES PATENTS

| | | | |
|---|---|---|---|
| 2,130,948 | 9/1938 | Carothers | 260/78 R |
| 2,512,606 | 6/1950 | Bolton et al. | 260/78 R |
| 3,505,109 | 4/1970 | Schnell et al. | 117/237 |
| 3,817,903 | 6/1974 | Hill, Jr. et al. | 260/33.8 R |
| 3,838,111 | 9/1974 | Campbell | 260/33.4 |

FOREIGN PATENTS OR APPLICATIONS 849,451  9/1960  United Kingdom.................. 156/308

*Primary Examiner*—William A. Powell
*Assistant Examiner*—Brian J. Leitter

[57] ABSTRACT

Copolyamides produced from a bis(4-aminocyclohexyl)methane or methyl derivative thereof, a phenylindanedicarboxylic acid or alkyl derivative thereof, and at least one straight chain dicarboxylic acid are dissolved in a solvent system comprising a mixture of a lower alcohol and a chlorocarbon, particularly effective solvent systems comprising a mixture of either methanol or ethanol and mixtures thereof with at least one chlorocarbon selected from chloroform, methylene chloride, carbon tetrachloride, trichloroethylene, 1,1,2-trichloroethane, 1,1,2,2-tetrachloroethane, and mixtures thereof. The copolyamide solutions are useful in a variety of applications such as in casting films, in coating objects, in preparing finely divided copolyamides for further use, in making laminates, in preparing fibers, in solvent welding, and the like.

10 Claims, No Drawings

COPOLYAMIDE-SOLVENT SYSTEMS

This application is a divisional application of our copending application having Ser. No. 269,096, filed July 5, 1972, for "Copolyamide-Solvent Systems," now U.S. Pat. No. 3,817,903.

This invention relaes to the production of polymer solutions. In accordance with another aspect, this invention relates to the formation of solutions of copolyamides formed from bis(4-aminocyclohexyl)methane compounds, phenylindanedicarboxylic acids, and straight chain dicarboxylic acids. In accordance with another aspect, this invention relates to copolyamide-solvent systems comprising a mixture of a lower alcohol and a chlorocarbon compound. In accordance with still another aspect, this invention relates to the formation of films, particulate polymers, and solvent welding of copolyamides comprising dissolving a copolyamide in a solvent system comprising a mixture of a lower alcohol and a chlorocarbon compound.

Various polyamides formed from the condensation reaction of bis(4-aminocyclohexyl)methane, herein referred to as PACM, or methyl derivatives thereof, and various dicarboxylic acids are known. Such materials are often employed as synthetic fibers, as well as being formed into other molded articles. It is also known that there can be produced a copolyamide of PACM or methyl derivatives thereof and a phenylindanedicarboxylic acid with a straight chain dicarboxylic acid as an additional monomer, which copolyamide has unusual properties in respect to making a copolyamide suitable for molding and the like. It has been found that these copolyamides are difficult to form into solutions and their utility is thereby somewhat limited. In accordance with the invention, solvent systems comprising selected lower alcohols and chlorocarbon compounds have been found into which the copolyamides can be readily dissolved.

Accordingly, an object of this invention is to provide novel copolyamide-solvent systems.

Another object of this invention is to provide new uses for copolyamides.

Another object of this invention is to provide solution processes by which copolyamides can be utilized in various commercial applications.

Another object of this invention is to provide a convenient method for dissolving copolyamides.

Other objects and aspects as well as the several advantages of the invention will be apparent to those skilled in the art upon reading the specification and the appended claims.

In accordance with the invention, copolyamides produced from bis(4-aminocyclohexyl)methane or methyl derivatives thereof and phenylindanedicarboxylic acids or alkyl derivatives thereof with straight chain dicarboxylic acids are dissolved in a solvent system comprising a mixture of (1) an alcohol selected from methanol, ethanol, and mixtures thereof, and (2) a chlorocarbon compound.

The chlorocarbon compounds that can be employed along with either methanol or ethanol or mixtures thereof to dissolve the above-defined copolyamides include chloroform, methylene chloride, carbon tetrachloride, trichloroethylene, 1,1,2-trichloroethane, 1,1,2,2,-tetrachloroethane, and mixtures thereof.

It has been found that neither the alcohol alone nor the chlorocarbon alone, even at refluxing temperature and atmospheric pressure, can be used to prepare solutions containing substantial amounts, e.g., at least one weight percent, of the dissolved copolyamide. Other common solvents and mixtures thereof also have been found to be unsatisfactory.

The copolyamide solutions formed according to the invention are useful in a variety of applications such as in casting films, in coating objects, in preparing a finely divided copolyamide for subsequent use such as in fluidized bed coating processes, in making laminates such as prepregs from fiberglass cloth, in preparing fibers by wet or dry spinning, in solvent welding, and the like.

In the solvent system of this invention, the volume ratio of alcohol to chlorocarbon should be within the range of about 5:95 to 95:5, preferably about 15:85 to 60:40. Although the temperature at which the dissolution of the polymer is conducted can vary over a considerable range, generally it will be within the range of about 20°C up to the refluxing temperature of the solution at atmospheric pressure. Although higher or lower pressures can be employed, atmospheric pressure is usually preferred for reasons of economy. Higher pressures are required when it is desired that a temperature be used which is higher than the refluxing temperature of the solution at atmospheric pressure.

The bis(4-aminocyclohexyl)methane or methyl derivative thereof employed in the production of the copolyamide used in this invention can be represented by the formula

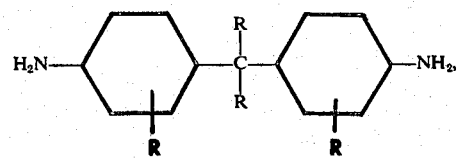

wherein each R is selected from hydrogen and methyl radicals. Mixtures of these diamines can be employed. Any of the geometric isomers or mixtures thereof can be used. The unsubstituted bis(4-aminocyclohexyl)methane is the diamine presently preferred.

The phenylindanedicarboxylic acid or alkyl derivative thereof applicable in the preparation of the copolyamide used in this invention can be represented by the formula

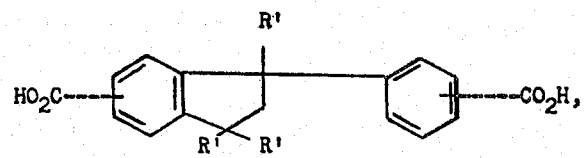

wherein each R' is selected from hydrogen and alkyl radicals having 1–3 carbon atoms. Mixtures of compounds represented by this formula can be employed. The compound of the above structure presently preferred for use in this invention is 1,1,3-trimethyl-5-carboxy-3-(p-carboxyphenyl)indane.

The straight chain dicarboxylic acid which is used as a comonomer in the production of the copolyamide employed in this invention can be represented by the formula $HO_2C(CH_2)_xCO_2H$, wherein $x$ is an integer of 4–16. Preferably, $x$ has a value of 5–10, this value being the average value of $x$ when a mixture of straight chain dicarboxylic acids is employed.

The straight chain dicarboxylic acids containing 6 to 18 carbon atoms include adipic acid, pimelic acid, suberic acid, azelaic acid, sebacic acid, undecanedioic acid, pentadecanedioic acid, dodecanedioic acid, tridecanedioic acid, tetradecanedioic acid, heptadecanedioic acid, octadecanedioic acid, and hexadecanedioic acid and their mixtures.

If desired, mixtures of copolyamides prepared from the above monomers can be used.

In the polymerization process, the molar ratio of the dicarboxylic acids to the diamine should be substantially 1:1, although a slight excess, e.g., up to about 5 mole percent, of acid or amine can be used. The straight chain dicarboxylic acid can constitute up to about 85 mole percent, e.g., about 15–85 mole percent, of all the dicarboxylic acids used, preferably constituting about 50–80 mole percent of the total amount of dicarboxylic acids employed. The copolyamides thus produced are amorphous and therefore optically clear.

The copolyamides used in this invention can be prepared by conventional polymerization procedures, e.g., by a melt polymerization process such as that described in U.S. Pat. No. 2,512,606. The polymerization preferably is conducted at a temperature within the range of about 260°–340°C for about 2–6 hours; however, polymerization temperatures and reaction times outside these ranges can be employed. Water can be present to serve as a heat transfer agent and to aid in keeping the reactants in the reaction zone.

Although any of the solutions of copolyamides described above are useful in any of the applications disclosed above for such solutions, a copolyamide prepared from bis(4-aminocyclohexyl)methane and a mixture of suberic acid and 1,1,3-trimethyl-5-carboxy-3-(p-carboxyphenyl)indane in a molar ratio of 75 to 25, respectively, is particularly useful in the casting of films, e.g., from a 30/70 volume percent mixture of methanol and chloroform with drying of the film at an elevated temperature not exceeding about 60°C, e.g., at about 55°C; in the preparation of a finely divided copolyamide for uses such as in fluidized bed coating operations, the powdered polymer being prepared, e.g., by adding acetone to a hot solution of the copolyamide in a 50/50 volume percent mixture of methanol and chloroform, followed by cooling and filtration of the resulting finely divided polymer; and in solvent welding, e.g., through use of a 50/50 volume percent mixture of methanol and chloroform. Similar procedures are applicable for use with the other copolyamides described above.

Because of the low permeability of the copolyamides employed in the solutions of this invention to substances such as oxygen, carbon dioxide, and hydrocarbons, the solutions of this invention are particularly useful for coating containers made from more permeable materials of low cost such as polyolefins, e.g., polyethylene or polypropylene, to decrease the permeability of the container. Additionally, cloth made from a reinforcing agent such as fiberglass can be impregnated with a solution of the copolyamide, followed by removal of solvent, to provide prepregs which can be thermally bonded to produce strong, stiff laminates.

The solutions of this invention may have dissolved or suspended therein various fillers or additives such as pigments, stabilizers, softeners, extenders, or other polymers. For example, there can be present substances such as graphite, carbon black, titanium dioxide, iron oxide, glass fibers, carbon fibers, metal powders, megnesia, silica, asbestos, wollastonite, clays, wood flour, cotton floc, alpha-cellulose, mica, and the like. A more complete list of fillers is disclosed in Modern Plastics Encyclopedia, 41, No. 1a, September 1963, pages 529–536.

In the preparation of each in a series of copolyamides, a mixture containing approximately equimolar quantities of bis(4-aminocyclohexyl)methane and dicarboxylic acids was heated in the presence or absence of water to a final temperature of about 320°C over a period of 2.5 hours under a nitrogen atmosphere. After 1 hour at this temperature, volatile material was vented, and heating was continued at about 320°C for approximately one hour under a slow nitrogen flush and for an additional hour under vacuum (20–200 mm Hg). Copolyamides thus produced were employed in the following examples. A homopolymer, whose use is outside the scope of this invention, was prepared in a similar manner, except without the straight chain acid, and employed in an example below. In each of the examples bis(4-aminocyclohexyl)methane is designated as PACM and 1,1,3-trimethyl-5-carboxy-3-(p-carboxyphenyl)indane is designated as PIDA. Unless otherwise shown, the PACM contained 54 percent trans,-trans isomer. The term PACM-8/PIDA, when used, refers to a copolyamide of PACM containing 54 percent trans,trans isomer and a mixture of suberic acid and PIDA in a molar ratio of 75 to 25, respectively. Inherent viscosity values shown for the polyamides are based on measurements at 30°C on m-cresol solutions having a polyamide concentration of 0.5 gram per 100 milliliters solution.

EXAMPLE I

One gram of PACM-8/PIDA (inherent viscosity 0.75) was refluxed in 100 milliliters of methanol for 2 hours. The polymer was removed by filtration and the solvent was evaporated, yielding 0.0315 gram of residue. Thus, methanol was unsatisfactory as a solvent.

EXAMPLE II

One gram of PACM-8/PIDA (inherent viscosity 0.75) was refluxed in 100 milliliters of chloroform for 2 hours. The polymer was removed by filtration and the solvent was evaporated, yielding 0.0353 gram of residue. Therefore, chloroform was unsuitable as a solvent.

EXAMPLE III

Ten grams of PACM-8/PIDA (inherent viscosity 0.63) was stirred at room temperature in 100 milliliters of a 70/30 volume percent mixture of methanol and chloroform for 10 days. The undissolved polymer was removed by filtration and the solvent was evaporated, yielding 3.21 grams of polymer which had been dissolved. Thus, this mixture of methanol and chloroform was a satisfactory solvent for the copolyamide.

EXAMPLE IV

Ten grams of PACM-8/PIDA (inherent viscosity 0.63) was dissolved in 100 milliliters of a 50/50 volume percent mixture of methanol and chloroform by stirring at room temperature for 3½ hours. A total of 21 grams of polymer was dissolved before gelation occurred.

Thus, this mixture of methanol and chloroform was an excellent solvent for the copolyamide.

EXAMPLE V

Ten grams of PACM-8/PIDA (inherent viscosity 0.63) was dissolved in 100 milliliters of a 30/70 volume percent mixture of methanol and chloroform by stirring at room temperature for 2 hours. A total of 23 grams of polymer dissolved before gelation occurred. Thus, this mixture of methanol and chloroform was especially suitable as a solvent.

EXAMPLE VI

A total of 23 grams of PACM-8/PIDA (inherent viscosity 0.63) was dissolved in 100 milliliters of a 15/85 volume percent mixture of methanol and chloroform by stirring at room temperature. Thus, this mixture of methanol and chloroform also was shown to be an excellent solvent for the popolyamide.

EXAMPLE VII

One gram of PACM-8/PIDA (inherent viscosity 0.63) was stirred at room temperature in 100 milliliters of a 50/50 volume percent mixture of methanol and carbon tetrachloride. The polymer dissolved, indicating the suitability of this mixture as a solvent.

EXAMPLE VIII

One gram of the polymer of Example VII was stirred at room temperature in 100 milliliters of a 50/50 volume percent mixture of methanol and trichloroethylene. All of the polymer dissolved, indicating the suitability of this solvent system.

EXAMPLE IX

One gram of the polymer of Example VII was stirred at room temperature in 100 milliliters of a 50/50 volume percent mixture of methanol and methylene chloride. Again, all of the polymer dissolved, indicating the suitability of this solvent system.

EXAMPLE X

One gram of the polymer of Example VII was stirred at room temperature in 100 milliliters of a 50/50 volume percent mixture of ethanol and chloroform. All of the polymer dissolved, illustrating the suitability of this solvent system.

EXAMPLE XI

One gram of the polymer of Example VII was stirred at room temperature in 100 milliliters of a 50/50 volume percent mixture of 2-propanol and chloroform. In this instance the polymer did not dissolve, illustrating this system to be unsuitable as a solvent for the polymer.

EXAMPLE XII

One gram of the polymer of Example VII was stirred at room temperature in 100 milliliters of a 50/50 volume percent mixture of methanol and acetone. Again, the polymer did not dissolve, showing the mixture of methanol and acetone to be unsuitable as a solvent for the polymer.

EXAMPLE XIII

One gram of the copolyamide (inherent viscosity 0.77) from PACM and a 90/10 mole percent mixture of suberic acid and PIDA was stirred at room temperature in 100 milliliters of a 50/50 volume percent mixture of methanol and chloroform. The polymer was not completely soluble, indicating its unsuitability in preparing a solution in the solvent system used.

EXAMPLE XIV

One gram of the copolyamide (inherent viscosity 0.86) from PACM and an 85/15 mole percent mixture of suberic acid and PIDA was stirred at room temperature in 100 milliliters of a 50/50 volume percent mixture of methanol and chloroform. All of the polymer dissolved, illustrating the suitability of this polyamide for preparing solutions of this invention.

EXAMPLE XV

One gram of the copolyamide (inherent viscosity 0.59) from PACM and a 60/40 mole percent mixture of suberic acid and PIDA was stirred at room temperature in 100 milliliters of a 50/50 volume percent mixture of methanol and chloroform. All of the polymer dissolved, illustrating the suitability of this copolyamide in the production of the solutions of this invention.

EXAMPLE XVI

One gram of the copolyamide (inherent viscosity 0.66) from PACM containing 29 percent trans,trans isomer and a 75/25 mole percent mixture of suberic acid and PIDA was stirred at room temperature in 100 milliliters of a 50/50 volume percent mixture of methanol and chloroform. All of the polymer dissolved, showing the suitability of this copolyamide derived from PACM of relatively low trans,trans isomer content.

EXAMPLE XVII

One gram of the copolyamide (inherent viscosity 0.78) from PACM containing 69 percent trans,trans isomer and a 75/25 mole percent mixture of suberic acid and PIDA was stirred at room temperature in 100 milliliters of a 50/50 volume percent mixture of methanol and chloroform. All of the polymer dissolved, illustrating the suitability of a copolyamide derived from PACM of relatively high trans,trans isomer content.

EXAMPLE XVIII

One gram of the homopolyamide (inherent viscosity 0.33) from PACM and PIDA was stirred at room temperature in 100 milliliters of a 50/50 volume percent mixture of methanol and chloroform. This homopolymer, whose use is outside the scope of this invention, was not completely soluble.

EXAMPLE XIX

One gram of the copolyamide (inherent viscosity 0.87) from PACM and a 70/30 mole percent mixture of dodecanedioic acid and PIDA was stirred at room temperature in 100 milliliters of a 50/50 volume percent mixture of methanol and chloroform. All of the polymer dissolved, showing the suitability of this polymer for preparing solutions of this invention.

EXAMPLE XX

One gram of the copolyamide (inherent viscosity 0.78) from PACM and a 70/30 mole percent mixture of azelaic acid and PIDA was stirred at room temperature in 100 milliliters of a 50/50 volume percent mixture of methanol and chloroform. All of the polymer dissolved, indicating it to be suitable for preparing solutions within the scope of this invention.

EXAMPLE XXI

One gram of the copolyamide (inherent viscosity 0.63) from PACM containing 25 percent trans,trans isomer and a 75/25 mole percent mixture of adipic acid and PIDA was stirred at room temperature in 100 milliliters of a 50/50 volume percent mixture of methanol and chloroform. All of the polymer dissolved, illustrating this polymer to be useful in the preparation of solutions of this invention.

EXAMPLE XXII

One gram of the copolyamide (inherent viscosity 0.91) from PACM and a 40/40/20 mole percent mixture of adipic acid, azelaic acid, and PIDA was stirred at room temperature in 100 milliliters of a 50/50 volume percent mixture of methanol and chloroform. All of the polymer dissolved, showing it to be suitable for preparing solutions within the scope of this invention.

EXAMPLE XXIII

In the preparation of a polymer film, a solution of PACM-8/PIDA (inherent viscosity 0.63) in a 30/70 volume percent mixture of methanol and chloroform (23 grams of polymer in 150 milliliters of solvent) was prepared. A film was cast from this solution using a drawbar (10 mil thickness), followed by drying at 55°C, to give an optically clear film of 1–2 mils thickness having a high tensile strength of 11,800 psi and a high elongation of 30 percent, each determined by the method of ASTM D 638-68.

EXAMPLE XXIV

In the preparation of a copolyamide in finely divided form suitable for applications such as fluidized bed coating operations, a solution of 15 grams of PACM-8/PIDA (inherent viscosity 0.63) was prepared by dissolving the polymer in 100 milliliters of a 50/50 volume percent mixture of methanol and chloroform and heating the mixture to reflux. Acetone (300 milliliters) was added, and the mixture was cooled to 0°C. The precipitated polymer was filtered and dried in a vacuum overnight at 100°C. It was obtained as a white powder (14.6 grams) quite suitable for use in a fluidized bed coating process.

EXAMPLE XXV

As an illustration of the utility of the solutions of this invention in solvent welding processes, an injection molded tensile bar of PACM-8/PIDA (inherent viscosity 0.81) was cut in two pieces. The ends were placed in a 1/16-inch layer of a 50/50 volume percent mixture of methanol and chloroform for 1 minute. The two pieces were reassembled and held in place with slight positive pressure for 1 minute. The reassembled bar was then dried (no pressure) in an oven (small air flow) at 55°C for 16 hours. Testing revealed that the welded bar had a tensile strength of 5,600 psi as determined by the method of ASTM D 638-68.

We claim:

1. A process for the solvent welding of articles formed from a copolyamide comprising the reaction product of (a) one of bis(4-aminocyclohexyl)methane and methyl derivatives thereof, (b) a phenylindanedicarboxylic acid or alkyl derivative thereof wherein the alkyl group contains from 1 to 3, inclusive, carbon atoms, and (c) a straight chain dicarboxylic acid having from 6 to 18, inclusive, carbon atoms per molecule, wherein the molar ratio of (a) to the total of (b) and (c) is approximately 1:1 and (c) constitutes up to 85 mole percent of the total of (b) and (c), which comprises contacting the copolyamide articles at the surfaces to be joined with a solvent system consisting essentially of a mixture of (d) an alcohol selected from methanol, ethanol and mixtures thereof and (e) a chlorocarbon selected from chloroform, methylene chloride, carbon tetrachloride, trichloroethylene, 1,1,2-trichloroethane, 1,1,2,2-tetrachloroethane, and mixtures thereof, and then pressing the solvent softened portions into contact and allowing solvent to evaporate and weld the copolyamide articles together.

2. A process according to claim 1 wherein the volume ratio of (d) to (e) is in the range of 5:95 to 95:5.

3. A process according to claim 1 wherein the volume ratios of (d) to (e) are in the range of 15:85 to 60:40 and (c) constitutes 50–80 mole percent of the total amount of (b) and (c).

4. A process according to claim 1 wherein (a) is bis(4-aminocyclohexyl)methane (PACM), (b) is 1,1,3-trimethyl-5-carboxy-3-(p-carboxyphenyl)indane (PIDA), (c) is suberic acid, (d) is methanol, and (e) is chloroform, and further wherein the assembled solvent softened articles are heated for a period of time sufficient to evaporate the solvent therefrom leaving a bonded article having desirable physical properties.

5. A process according to claim 1 wherein (a) is bis(4-aminocyclohexyl)methane (PACM), (b) is 1,1,3-trimethyl-5-carboxy-3-(p-carboxyphenyl)indane (PIDA) and (c) is adipic, suberic, azelaic, or dodecanedioic acid, or mixtures thereof.

6. A process according to claim 1 wherein (a) is bis(4-aminocyclohexyl)methane (PACM), (b) is 1,1,3-trimethyl-5-carboxy-3-(p-carboxyphenyl)indane (PIDA), (c) is suberic acid, (d) is methanol, and (e) is at least one chloroform, carbon tetrachloride, trichloroethylene, and methylene chloride.

7. A process according to claim 3 wherein (a) is bis(4-aminocyclohexyl)methane (PACM), (b) is 1,1,3-trimethyl-5-carboxy-3-(p-carboxyphenyl)indane (PIDA), and (c) is adipic, suberic, azelaic, or dodecanedioic acid, or mixtures thereof.

8. A method for uniting surfaces of elements which comprises:

a. applying to at least one of said surfaces a polymer solution comprising (1) a copolyamide comprising the reaction product of (A) one of bis(4-aminocyclohexyl)methane and methyl derivatives thereof. (B) a phenylindanedicarboxylic acid or alkyl derivative thereof wherein the alkyl group contains from 1 to 3, inclusive, carbon atoms, and (C) a straight chain dicarboxylic acid having from 6 to 18, inclusive, carbon atoms, wherein the molar ratio of (A) to the total of (B) and (C) is approximately 1:1 and (C) constitutes up to 85 mole percent of the total of (B) and (C) and (2) a solvent system consisting essentially of a mixture of (D) an alcohol selected from methanol, ethanol and mixtures thereof and (E) a chlorocarbon selected from chloroform, methylene chloride, carbon tetrachloride, trichloroethylene, 1,1,2-trichloroethane, 1,1,2,2-tetrachloroethane, and mixtures thereof, and b. holding said surfaces contiguous to one another with said polymer solution disposed therebetween for a period of time and under conditions sufficient to evaporate said solvent system, and allowing said copolyamide to bond to said surfaces and form a laminated structure.

9. A method for coating surfaces of substrates which comprises:

a. applying to a surface of said substrate a polymer solution comprising (1) a copolyamide comprising the reaction product of (A) one of bis(4-aminocyclohexyl)methane and methyl derivatives thereof, (B) a phenylindanedicarboxylic acid or alkyl derivative thereof wherein the alkyl group contains from 1 to 3, inclusive, carbon atoms, and (C) a straight chain dicarboxylic acid having from 6 to 18, inclusive, carbon atoms per molecule, wherein the molar ratio of (A) to the total of (B) and (C) is approximately 1:1 and (C) constitutes up to 85 mole percent of the total of (B) and (C) and (2) a solvent system consisting essentially of a mixture of (D) an alcohol selected from methanol, ethanol and mixtures thereof and (E) a chlorocarbon selected from chloroform, methylene chloride, carbon tetrachloride, trichloroethylene, 1,1,2-trichloroethane, 1,1,2,2-tetrachloroethane, and mixtures thereof, and b. allowing at least a portion of the solvent system to evaporate and permitting said copolyamide to bond to said surface and form a coated structure.

10. A method according to claim 9 wherein the coated structure of step (b) is held contiguous with a second surface with said copolyamide disposed therebetween and allowing said copolyamide to bond to said second surface and form a laminated structure.

* * * * *